United States Patent [19]

Owen

[11] 3,916,281

[45] Oct. 28, 1975

[54] VOLTAGE REGULATOR CONTROL CIRCUIT

[75] Inventor: Allan B. Owen, Lycoming, Pa.

[73] Assignee: GTE Sylvania Incorporated, Stamford, Conn.

[22] Filed: May 9, 1974

[21] Appl. No.: 468,396

[52] U.S. Cl. ............................. 321/2; 323/DIG. 1
[51] Int. Cl.² ................................. H02M 3/335
[58] Field of Search ............ 321/2, 19; 323/DIG. 1, 323/17

[56] References Cited
UNITED STATES PATENTS

| | | | |
|---|---|---|---|
| 3,435,320 | 3/1969 | Lee et al. | 321/2 |
| 3,490,028 | 1/1970 | Modiano | 321/2 |
| 3,497,794 | 2/1970 | Fredrickson et al. | 321/2 |
| 3,562,623 | 2/1971 | Farnsworth | 321/2 |
| 3,571,697 | 3/1971 | Phillips | 323/DIG. 1 |
| 3,742,371 | 6/1973 | Seibt et al. | 321/2 |
| 3,790,878 | 2/1974 | Brokaw | 321/2 |

FOREIGN PATENTS OR APPLICATIONS 1,152,295  5/1969  United Kingdom..................... 321/2

*Primary Examiner*—William M. Shoop
*Attorney, Agent, or Firm*—Norman J. O'Malley; Thomas H. Buffton; Cyril A. Krenzer

[57] ABSTRACT

A voltage regulation control circuit for a magnetically-coupled inductive discharge switching regulator suitable for use in an automotive electrical system provides a regulated output voltage isolated from an unregulated input potential source and controls the rate of energy transfer from an inductor to a capacitor in accordance with the unregulated potential source and the regulated output voltage.

4 Claims, 2 Drawing Figures

3,916,281

VOLTAGE REGULATOR CONTROL CIRCUIT

BACKGROUND OF THE INVENTION

Vehicle electrical systems have been plagued with the problem of providing efficient and reliable regulated power at low cost and with a minimum of circuit complexity. Known techniques include such apparatus as transformer-coupled oscillators or "inverters" which efficiently provide isolated voltages but suffer from relatively poor regulation of the output voltage. Filtered switching regulators efficiently provide regulated output potentials but lack isolation of input and output potentials and cannot provide output voltages of any greater magnitude than the input or potential source.

Another form of apparatus for providing regulated power in a motor vehicle is a series pass voltage regulator which provides good regulation but fails to provide high efficiency operation, isolated output potentials, or output potentials of greater magnitude than the input or potential source. Moreover, inductive discharge switching regulators efficiently provide regulated output potentials but are unable to provide either isolated output potentials or output potentials having a value less than that of the potential source. Thus, efficiently obtaining a regulated output potential derived and isolated from an unregulated potential source and unconstrained by its magnitude remains a problem.

OBJECTS AND SUMMARY OF THE INVENTION

An object of the present invention is to provide an enhanced voltage regulator suitable for use in automotive electrical systems. Another object of the invention is to provide a regulated output voltage above, below or within the range of the electrical input voltage of an automotive vehicle. Still another object of the invention is to provide a control circuit for improving the regulation of a voltage supply. A further object of the invention is to provide a control circuit for a power supply which regulates the output voltage by responding to changes in the potential source and potential output of the power supply.

These and other and further objects, advantages and capabilities are achieved in one aspect of the invention by a magnetically-coupled inductive discharge switching regulator means having a control circuit wherein a switching means is activated in response to a threshold switch controlled by an output potential and by a triggered timer means in accordance with current flow through the switching means to provide a regulated output potential isolated from an unregulated input potential source.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
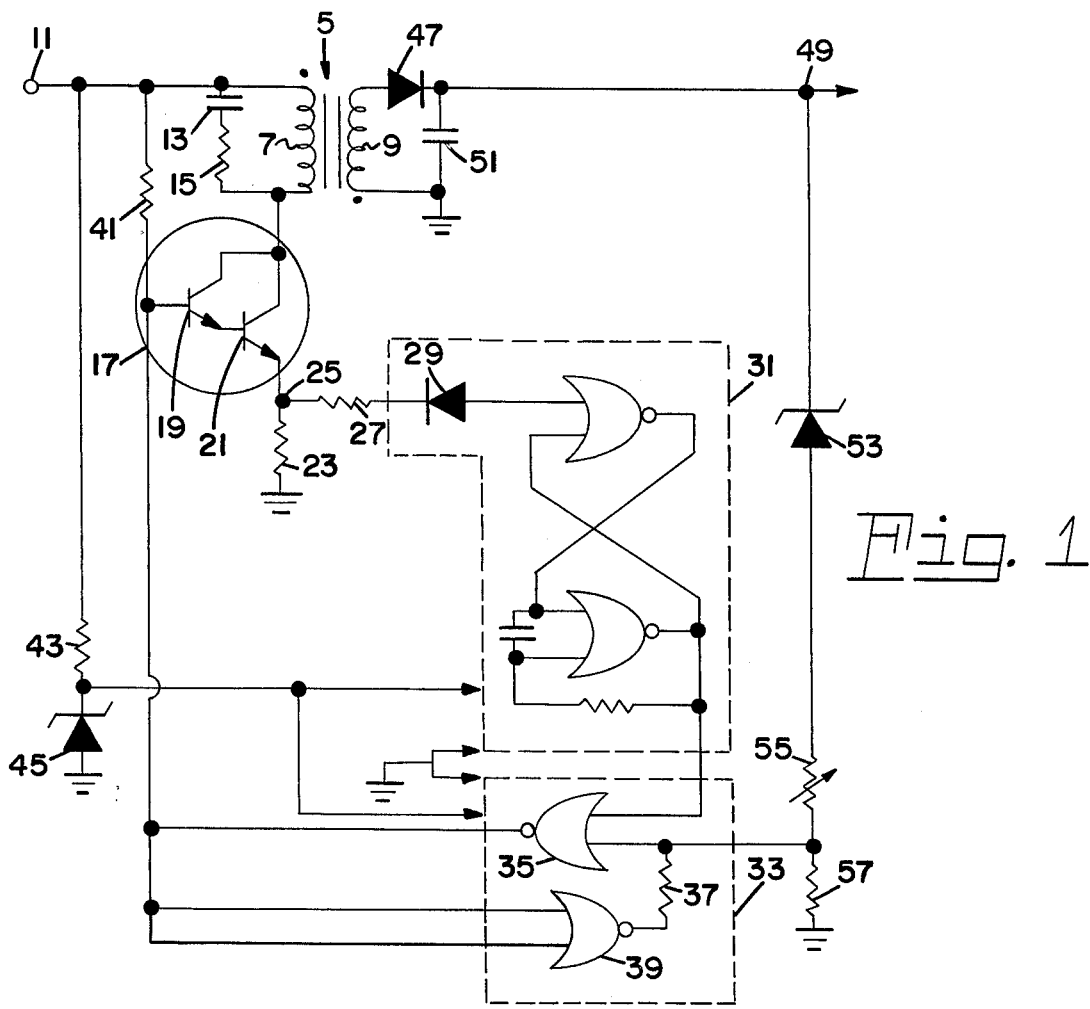
FIG. 1 is an illustration, in schematic form, of a preferred embodiment of the invention.

Referring to FIG. 1 of the drawings, a magnetically-coupled inductive discharge switching regulator means includes a transformer 5 having primary and secondary windings, 7 and 9 respectively. One end of the primary winding 7 is connected to input terminal 11 for coupling to an unregulated potential source, and to a series connected capacitor 13 and resistor 15 shunting the primary winding 7. The opposite end of the primary winding 7 is coupled to a switching means 17.

The switching means 17, in this instance, is in the form of a Darlington circuit with the collectors of a pair of transistors, 19 and 21 connected to the primary winding 7 and the emitter of the transistor 21 connected to a current sensing means, in the form of a resistor 23, coupled to circuit ground. A junction 25 of the switching means 17 and current sensing means 23 is coupled by a resistor 27 to a triggered timer means 31. The triggering timer means 31 is in the form of a one-shot multivibrator coupled by a diode 29 to the resistor 27. A threshold switching means illustrated as a Schmidt trigger circuit 33 includes a gating means in the form of a Nor-gate 35 coupled to the triggered timer means 31 and by a resistor 37 to a feedback amplifier 39. The Schmidt trigger circuit 33 is coupled to the switching means 17 and by way of a resistor 41 to the input terminal 11. A resistor 43 and Zener diode 45 series connecting the input terminal 11 to circuit ground forms a potential source coupled to the triggered timer means 31 and Schmidt trigger circuit 33.

Referring back to the transformer 5, the secondary winding 9 is coupled by a diode 47 to an output terminal 49 with a charging capacitor 51 connecting the diode 47 and output terminal 49 to a potential reference level such as circuit ground. A Zener diode 53 and series connected adjustable resistor 55 and fixed resistor 57 couple the output terminal 49 to circuit ground. The junction of the series connected adjustable and fixed resistors 55 and 57' is connected to the Schmidt trigger circuit 33.

As to operation, it should perhaps first be noted that the transformer 5 is not a transformer in the usual meaning. Rather, the transformer 5 acts as a choke wherein energy is stored in the magnetic core when the switching means 17 is conductive and released when the switching means 17 is nonconductive. In other words, polarity reversal in the primary winding 7, due to the action of the switching means 17, permits current flow in the secondary winding 9, charging of the capacitor 51, and generation of the potential at the output terminal 49.

More specifically, the switching means 17 controls current in the primary winding 7 of transformer 5 wherein magnetic energy is generated. When current flow in the primary winding 7 is increasing magnetic energy is generated and a voltage is induced into the secondary winding 9. Due to the polarity of the primary to secondary windings and the half-wave rectifier, represented as a diode 47, no current charges the capacitor 51 during this period of increased current flow in the primary winding 7.

However, activation of the switching means 17, turning off the current flow in the primary winding 7, causes a reversal in the induced voltage of the secondary winding 9. Thereupon, current flows through the rectifier diode 47 and charges the capacitor 51. An increased charge of the capacitor 51 in turn, provides an increased potential at the output terminal 49. Thus, energy is magnetically coupled from primary to secondary windings 7 and 9 and transferred each cycle in accordance with the action of the switching means 17. Moreover, the potential appearing at the output terminal 49 can be greater, equal to, or less than the voltage at the input terminal 11 due to the isolation and multiple windings of the transformer 5.

As to control circuitry for the magnetically-coupled inductive discharge switching regulator means, regulation of the voltage appearing at the output terminal 49 is effected by digital ON/OFF control of the switching means 17. Moreover, this ON/OFF control of the switching means 17 is varied in accordance with the current flow of the primary winding 7 and the potential appearing at the output terminal 49.

The current flow of the primary winding 7 is sensed by the current sensing means, resistor 23, and applied to a one-shot multivibrator or triggered timer means 31. Upon reaching a given maximum value of current flow, the triggered timer means 31 applies a signal of a specific duration to the NOR-gate circuitry 35 which overrides the output of threshold switching means 33 and, in turn, turns off the switching means 17. Thus, the constant inductor characteristics and constant maximum current level cause a substantially identical amount of energy storage each cycle. Moreover, this constant energy is transferred to the charge capacitor 51 and output terminal 49 with the triggered timer means 31 providing a specific time duration sufficient to facilitate the energy transfer.

Also, the potential at the output terminal 49 is monitored by the threshold switching means 33. When this potential drops below a given threshold value, the threshold switching means 33 activates the NOR-gate circuit 35 output which, in turn, turns on the switching means 17 to begin energy storage for the next cycle. Thereupon, the stored energy of the next cycle is transferred to cause a desired increase in the potential at the output terminal 49.

Figure 2:
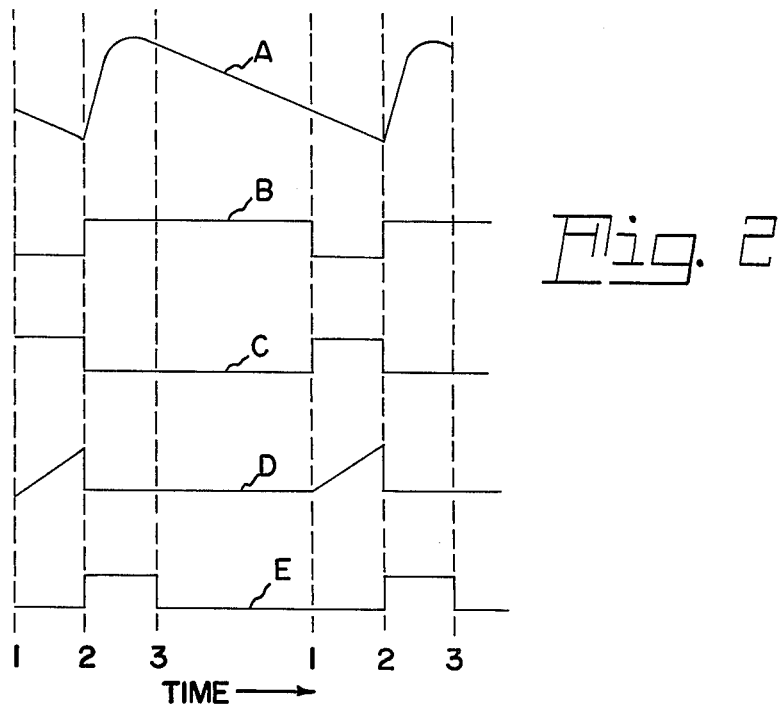
FIG. 2 is a graphic illustration of the operational potentials of the embodiment of FIG. 1.

Referring to the graphic illustrations of FIG. 2, assume a time 1 whereat the potential at the output terminal 49 has decreased to a value below the threshold of the threshold switching means 33, curve A. Thereupon, an inhibiting signal available at the feedback amplifier means 39 and applied to the NOR-gating means 35 will end, curve B, and the output from the NOR-gate means 35, curve C, will go high turning on the switching means 17. As a result, the current flow through the primary winding 7 and the switching means 17 will increase.

At a time 2, the current flow has increased to the peak value and the voltage at the current sensing means 23 reaches the input threshold of the triggered timer means 31, curve D. The triggered timer means 31 provides a "turn-off" pulse, curve E, which turns off the output from the NOR-gate means 35, curve C, and, in turn turns off the switching means 17. At a time 3, the turn-off signal from the triggered timer means 31, curve E, ends but the switching means 17 remains in a turned off condition due to the threshold switch signal, curve B, on the output from the NOR-gating means 35, curve C. However, when the potential at the output terminal 49, curve A, again decreases to the threshold of the threshold switching means 33, the switching means 17 will be turned on and the cycle starting at the time 1 is repeated.

Thus, there has been provided a unique control circuit for a magnetically-coupled inductive discharge switching regulator means suitable for employment in an automotive vehicle. The system can provide a regulated output voltage intermediate the upper and lower limits of an unregulated input potential or otherwise independent of the unregulated input potential range. Moreover, the output potential is efficiently generated, and is isolated from the input potential and the apparatus is inexpensive with a minimum of bulk and circuit complexity.

While there has been shown and described what is at present considered the preferred embodiment of the invention, it will be obvious to those skilled in the art that various changes and modifications may be made therein without departing from the invention as defined by the appended claims.

What is claimed is:

1. In a magnetically-coupled inductive discharge switching regulator, a voltage regulation control circuit comprising:
    magnetically-coupled inductive discharge switching regulator means having a primary winding coupled to a potential source and a secondary winding coupled to an output terminal;
    switching and current sensing means coupling said primary winding to a potential reference level;
    triggered timer means in the form of a one-shot multivibrator circuit coupled to said switching and current sensing means and to a potential reference level; and
    threshold switching means coupling said output terminal of said magnetically-coupled inductive discharge regulator means and said triggered timer means to said switching means of said switching and current sensing means whereby a regulated output potential isolated from an unregulated input potential source is provided.

2. A voltage regulator control circuit comprising:
    magnetically-coupled inductive discharge switching regulator means including a primary winding coupled to a potential source and to a switching means and a secondary winding coupled to an output terminal;
    current sensing means in the form of a resistor coupling said switching means to said potential reference level;
    triggered timer means in the form of a one-shot multivibrator coupled to said switching and current sensing means and to a potential reference level; and
    threshold switching means coupling said output terminal of said magnetically-coupled inductive discharge switching regulator means and said triggered timer means to said switching means and said magnetically-coupled inductive discharge switching regulator means whereby said output terminal provides a regulated output potential isolated from said potential source.

3. In a magnetically-coupled inductive discharge switching regulator, a voltage regulation control circuit comprising:
    magnetically-coupled inductive discharge switching regulator means having a primary winding coupled to a potential source and a secondary winding coupled to an output terminal;
    switching and current sensing means coupling said primary winding to a potential reference level;

triggered timer means coupled to said switching and current sensing means and to a potential reference level; and threshold switching means in the form of a Schmitt trigger circuit means coupling said output terminal of said magnetically-coupled inductive discharge regulator means and said triggered timer means to said switching means of said switching and current sensing means whereby a regulated output potential isolated from an unregulated input potential source is provided.

4. A voltage regulator control circuit comprising:

magnetically-coupled inductive discharge switching regulator means including a primary winding coupled to a potential source and to a switching means and a secondary winding coupled to an output terminal;

current sensing means coupling said switching means to a potential reference level;

triggered timer means coupled to said switching and current sensing means and to a potential reference level; and threshold switching means in the form of a Schmitt trigger circuit means coupling said output terminal of said magnetically-coupled inductive discharge switching regulator means and said triggered timer means to said switching means of said switching and current sensing means whereby said output terminal provides a regulated output potential isolated from a potential source.

\* \* \* \* \*